March 4, 1930.  H. BENIOFF  1,749,660
PLATE CURRENT SUPPLY FOR VACUUM TUBES
Filed Aug. 7, 1926
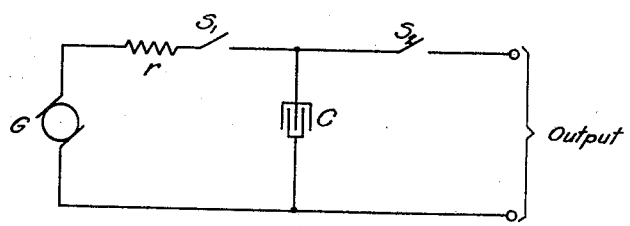
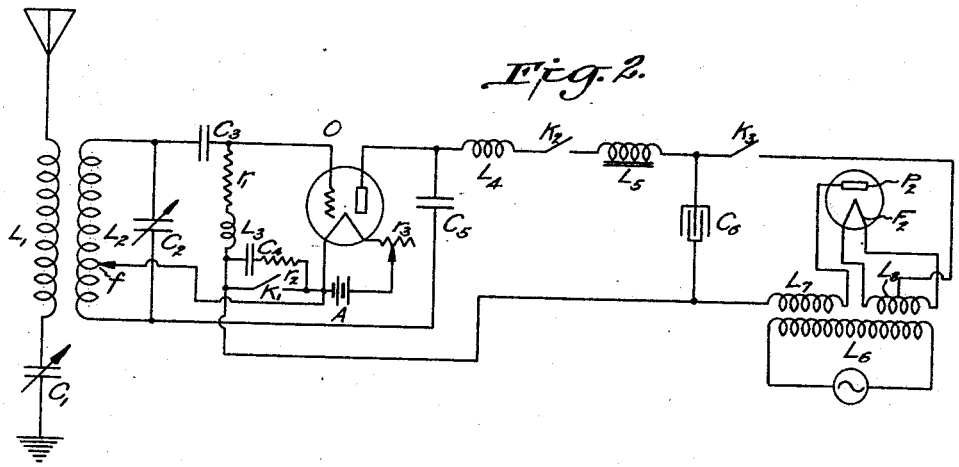
Inventor:
Hugo Benioff
By Byrnes Townsend Dickenstein
Attorneys.

Patented Mar. 4, 1930

1,749,660

UNITED STATES PATENT OFFICE

HUGO BENIOFF, OF PASADENA, CALIFORNIA, ASSIGNOR TO CARNEGIE INSTITUTION OF WASHINGTON, OF WASHINGTON, DISTRICT OF COLUMBIA, A CORPORATION OF THE UNITED STATES

PLATE-CURRENT SUPPLY FOR VACUUM TUBES

Application filed August 7, 1926. Serial No. 127,924.

This invention relates to a plate current supply for vacuum tubes and particularly to a method of and apparatus for obtaining a relatively high power supply from a source of direct or pulsating current which is of materially lower power.

The invention is particularly useful in connection with transmitting circuits where the required signals are of short duration and are separated by relatively long intervals, as in the case of minute-to-minute time signals, fog signals, etc.

In accordance with the invention a relatively low power source is employed to charge a condenser, and the condenser is then discharged through the plate circuit of the vacuum tube. As applied to a transmitter of intermittent signals, the condenser is charged at low power during the intervals between signals to deliver a high power signal of short duration. The length of the signal or time of discharge of the condenser is a function of the capacity of the condenser and the mean plate resistance of the tube or tubes through which it discharges. If desired, the discharge may be modified by the insertion of an inductance in the discharge circuit.

An object of the invention is to provide a method of and apparatus for intermittently supplying a vacuum tube plate circuit with high power obtained from a low power source. A further object is to provide a method of and apparatus for obtaining plate current supply for vacuum tubes in the form of a discharge from a charged condenser. More specifically, an object is to provide a method of and apparatus for supplying plate current to a vacuum tube transmitter by charging a condenser from a low power source of direct or pulsating current and discharging the condenser through the plate circuit.

These and other objects of the invention will be apparent from the following specification when taken with the accompanying drawings in which:

Fig. 1 is a circuit diagram of the essential elements of the condenser circuit; and Fig. 2 is a circuit diagram illustrating the invention as applied to a radio transmitter.

As shown in Fig. 1, the circuit for charging the condenser C includes a source of direct or pulsating current G, a regulating resistance $r$ and switch $s_1$. The direct current or pulsating direct current source may take the form of a direct current generator, a battery, or a kenotron, mechanical or other type of rectifier. The output circuit is connected across the condenser C and includes a switch $s_2$ which is closed to effect the discharge of the condenser through the output circuit. In some uses it may be desirable to open the charging switch $s_1$ before the discharging switch $s_2$ is closed. To recharge the condenser, switch $s_2$ is opened and switch $s_1$ is closed.

In Fig. 2, the radio transmitter to which the invention is applied comprises an antenna circuit $L_1C_1$ inductively coupled to the oscillator circuit $L_2C_2$ of the vacuum tube-oscillator O. The grid circuit includes the grid condenser $C_3$, grid leak $r_1$ and grid leak choke $L_3$. A switch $K_1$ is provided between the lower terminal of the choke $L_3$ and the filament, and a condenser $C_4$ and resistance $r_2$ are shunted around the switch to prevent sparking or arcing at the contacts. The filament is heated by a battery A or other appropriate source through a filament rheostat $r_3$. The plate is connected to the lower side of the oscillatory circuit $L_2C_2$ through a condenser $C_5$, and the filament is connected to an intermediate point of the inductance $L_2$ by an adjustable tap $f$.

The plate current supply is connected across the plate and that terminal of the switch $K_1$ which is spaced from the filament. The supply circuit includes a radio frequency choke $L_4$, a switch $K_2$, the storing condenser $C_6$ and, if desired, an inductance $L_5$ for modifying the character of the signal. As illustrated, the condenser is charged by a kenotron rectifier when the switch $K_3$ is closed. The plate P and filament F of the rectifier are energized from a suitable source of alternating current through the usual transformer $L_6$, $L_7$, $L_8$.

The signalling system shown in Fig. 2 may be operated by two different methods. According to the first method, the low side of the plate supply is permanently connected to the filament by maintaining the switch $K_1$ closed throughout the operation of the transmitter. Upon opening $K_2$ and closing $K_3$, the condenser $C_6$ will be charged by the rectifier. When the condenser has reached the desired charge, $K_2$ is closed and the condenser discharges through the plate circuit of the tube O, thus producing oscillations in the antenna circuit.

According to the second method of operation, the switch $K_2$ remains closed during the charging of the condenser and the control is effected by switch $K_1$. By opening $K_1$, the grid is charged negatively and prevents the flow of plate current during the step of charging the condenser. When the condenser has taken its charge, the switch $K_1$ is closed and the condenser discharges through the plate circuit. It will be noted that it is not necessary to open the charging circuit switch $K_3$ for operation in accordance with either method. Although switch $K_3$ is not essential to the operation of the system, it is preferably included to secure flexibility of control.

The switch or switches which control the supply of current to the oscillator may be operated manually or they may be operated automatically by the known systems for timing periodic radio signals.

It will be obvious that the invention is not limited to the particular circuit arrangement which is described herein, since the invention relates to the system for energizing the plate circuit and not to the system of coupling the grid and plate circuits. While I have shown a generator or a rectifier for charging the condenser, it will be apparent that other sources of direct current of constant or pulsating voltage may be employed.

I claim:

An oscillating transmitter comprising a vacuum tube, coupled grid and plate circuits therefor adapted to produce oscillations when the plate circuit is energized with direct current, said grid circuit including a grid leak connected to the grid of said tube and to the filament through a switch, a plate energizing circuit comprising a condenser connected between the plate of said tube and that terminal of said switch which is spaced from the filament, and means for charging said condenser.

In testimony whereof, I affix my signature.

HUGO BENIOFF.